United States Patent
Lemke

(10) Patent No.: US 6,196,504 B1
(45) Date of Patent: Mar. 6, 2001

(54) POSITIVE-LOCK-AND-RELEASE DEVICE FOR CAMERA MOUNTING

(76) Inventor: Maurice W. Lemke, 4605 S. 364th St., Auburn, WA (US) 98001

( * ) Notice: Subject to any disclaimer, the term of this patent is extended or adjusted under 35 U.S.C. 154(b) by 0 days.

(21) Appl. No.: 09/333,548

(22) Filed: Jun. 15, 1999

Related U.S. Application Data

(60) Provisional application No. 60/092,125, filed on Jul. 9, 1998.

(51) Int. Cl.[7] .................................................. F16M 11/20
(52) U.S. Cl. ........................................ 248/187.1; 396/428
(58) Field of Search .......................... 248/187.1, 177.1, 248/223.41; 396/428

(56) References Cited

U.S. PATENT DOCUMENTS

| | | | |
|---|---|---|---|
| 4,466,595 | 8/1984 | O'Connor | 248/558 |
| 4,525,052 | 6/1985 | Kosugi | 354/293 |
| 4,570,887 | 2/1986 | Banister | 248/187.1 |
| 4,763,151 | 8/1988 | Klinger | 354/293 |
| 4,929,973 | 5/1990 | Nakatani | 354/293 |
| 4,979,709 | 12/1990 | Ishikawa | 248/187.1 |
| 5,222,826 | 6/1993 | Hanke | 403/381 |
| 5,230,490 | 7/1993 | Sloop | 248/187.1 |
| 5,337,100 | 8/1994 | Oxford | 354/81 |
| 5,429,332 * | 7/1995 | Ishikawa | 248/187.1 |
| 5,725,187 | 3/1998 | Vo | 248/178.1 |
| 5,737,657 | 4/1998 | Paddock | 396/428 |

* cited by examiner

Primary Examiner—Ramon O. Ramirez

(57) ABSTRACT

A quick-release device that accommodates an interface connection between a camera and a support having a base plate (32) and a release plate (12) that has a predetermined configuration (21) (22) to allow for a locking plate (14), a detent pin (36), and a clamping block (34) that, when used in combination, provides for a quick, reliable and rigid joining of a camera and support device.

2 Claims, 3 Drawing Sheets

POSITIVE-LOCK-AND-RELEASE DEVICE FOR CAMERA MOUNTING

This application claims the benefit of U.S. provisional patent application Ser. No. 60/092,125, filed Jul. 9, 1998.

BACKGROUND

1. Field of Invention

This invention relates to a quick-release device that accommodates the interface connection of any camera-type device with any support device.

2. Description of Prior Art

Historically, manufacturers of cameras, lenses, or other optical devices have provided an aperture for attachment of a support device, such as tripods, monopods and ball heads, all having a threaded stud that accommodates their joining. The function of joining these devices has led to the development of products that quickly join or release the devices, known as a "Quick Release".

Typically, the quick-release system has developed around two basic design concepts, either plate and pocket or plate and slot (dovetail). In either concept, the base plate is to reliably hold the release plate and prevent any inadvertent release.

Traditionally, a release plate device must be attached to the camera, using the aperture as provided by the manufacturer. The always present problem is that of a single attach point being able to stop torsional twisting or loosening between the release plate and the camera.

The plates described in U.S. Pat. No. 5,725,187 to Vo (1998), U.S. Pat. No. 5,222,826 to Hankie (1993) and U.S. Pat. No. 4,929,973 to Nakatani (1990), reflect the most often used method, where twisting is prevented by inserting a second screw through the release plate. This second screw is then forced into the bottom surface of the camera, resulting in damage to surfaces not designed for indiscriminate penetrations. Conversely, U.S. Pat. No. 4,979,709 to Ishikawa (1990) and U.S. Pat. No. 5,429,332 to Ishikawa (1995) fail to address any method at all to stop unwanted torsional twisting between plate and camera.

Unfortunately, methods to stop torsional twisting have either been ignored or considered solved by introducing a second screw. However, a second screw is not acceptable by virtue of the resultant damage.

In general, all plate and pocket or the plate and slot design concepts do a reasonable job of holding the release plate once inserted into the base. Unfortunately, problems arise when the plate is released from the base by an accidental bumping or loosening of the clamping handle or lever. In fact, accidental loosening is so common some manufacturers only supply the clamping mechanism with the smallest round knob or the shortest lever. However, this approach is counter productive when trying to apply as much clamping pressure as possible as it is difficult to grip such small knobs or levers.

U.S. Pat. No. 5,725,187 to Vo (1998), U.S. Pat. No. 5,737,757 to Paddock (1998) and U.S. Pat. No. 5,429,332 to Ishikawa (1995) all suggest the use of small knobs or levers. Conversely, U.S. Pat. No. 5,230,490 to Sloop (1993) demonstrates the concern for inadvertent release by creating a complex system of cams, levers, springs, pins, and plates.

The underlying weakness of today's quick-release systems is the failure to provide a positive lock between the release plate and its base and to control torsional twisting between the release plate and the camera device.

Objects and Advantages

Accordingly, several objects and advantages of my invention are to provide a quick-release device that incorporates a reliable detent lock mechanism for an interface between the device release plate and its base and a clamping block that generates complete surface engagement. Also:

(a) the detent mechanism prevents accidental release of the camera device as a result of abusive handling;

(b) allows for usage of large knobs and handles for clamping;

(c) is not complex to manufacture;

(d) provides a safe interface lock with release plates having various sizes, i.e., short, long or square;

(e) allows random axis orientation of camera when release plate and base are joined.

Furthermore, to provide a quick-release device that incorporates an anti-twist locking plate that prevents torsional twisting or loosening of the camera device when mated to the quick-release plate. Also:

(f) requires only the attachment to the aperture provided by the devices manufacturer;

(g) is adjustable to accommodate the various aperture locations on various devices;

(h) eliminates the need for extreme torque loads being applied to a device aperture during attachment;

(i) does no damage to sensitive surfaces of camera devices;

(j) has no complex parts.

Further objects and advantages will become apparent from a consideration of the ensuing description and drawings.

DRAWING FIGURES

Reference Numerals In Drawings

| Parts: | | | |
|---|---|---|---|
| 10 | Release-Plate Assembly | 34 | Clamp Block |
| 12 | Release Plate | 36 | Detent Pin |
| 14 | Locking Plate | 38 | Retaining Plug |
| 16 | Plate Gasket | 40 | 'E' Clip |
| 18 | Attachment Screw | 42a/b | Spring |
| 30 | Release-Base Assembly | 44 | Clamp Handle |
| 32 | Base Plate | | |

-continued

| Features: | | | |
|---|---|---|---|
| 20 | Release Plate Tapper | 55 | Hole for Pull Ring (Not Shown) |
| 21 | Striations | 56 | Hole for Detent Pin 36 |
| 22 | Raised Deck | 57 | Hole for Plug 38 |
| 23 | Adjustment Cutout | 58 | Hole for Spring 42a |
| 24 | Locking Plate Cutout | 59 | Hole for Pin Nose 53 |
| 25 | Locking Plate Lip | 60 | Threaded Hole for 44 in 33 |
| 26 | Adjustment Cutout | 61 | Spring Hole in 32 for 42b |
| 50 | Supporting Device Mounting Hole | 62 | Hole for Clamp Handle 44 |
| 51 | Tapper of Base | 63 | Clamp Block Toe |
| 52 | Tapper of Clamp Block | 70 | Supporting Device (representative only) |
| 53 | Detent Pin Nose | | |
| 54 | 'E' Clip 40 Mounting Groove | 71 | Equipment Device (representative only) |

SUMMARY

To obtain the objectives of this invention I provide a quick-release interface connection for joining a camera to a support device. To provide a reliable connection utilizing a release plate and a base plate so configured so as to accomplish a quick, secure, and rigid joining. Additionally, the mating of these components will prevent accidental camera release as well as torsional stress to the camera device.

DESCRIPTION

FIGS. 1 to 6

Figure 1:
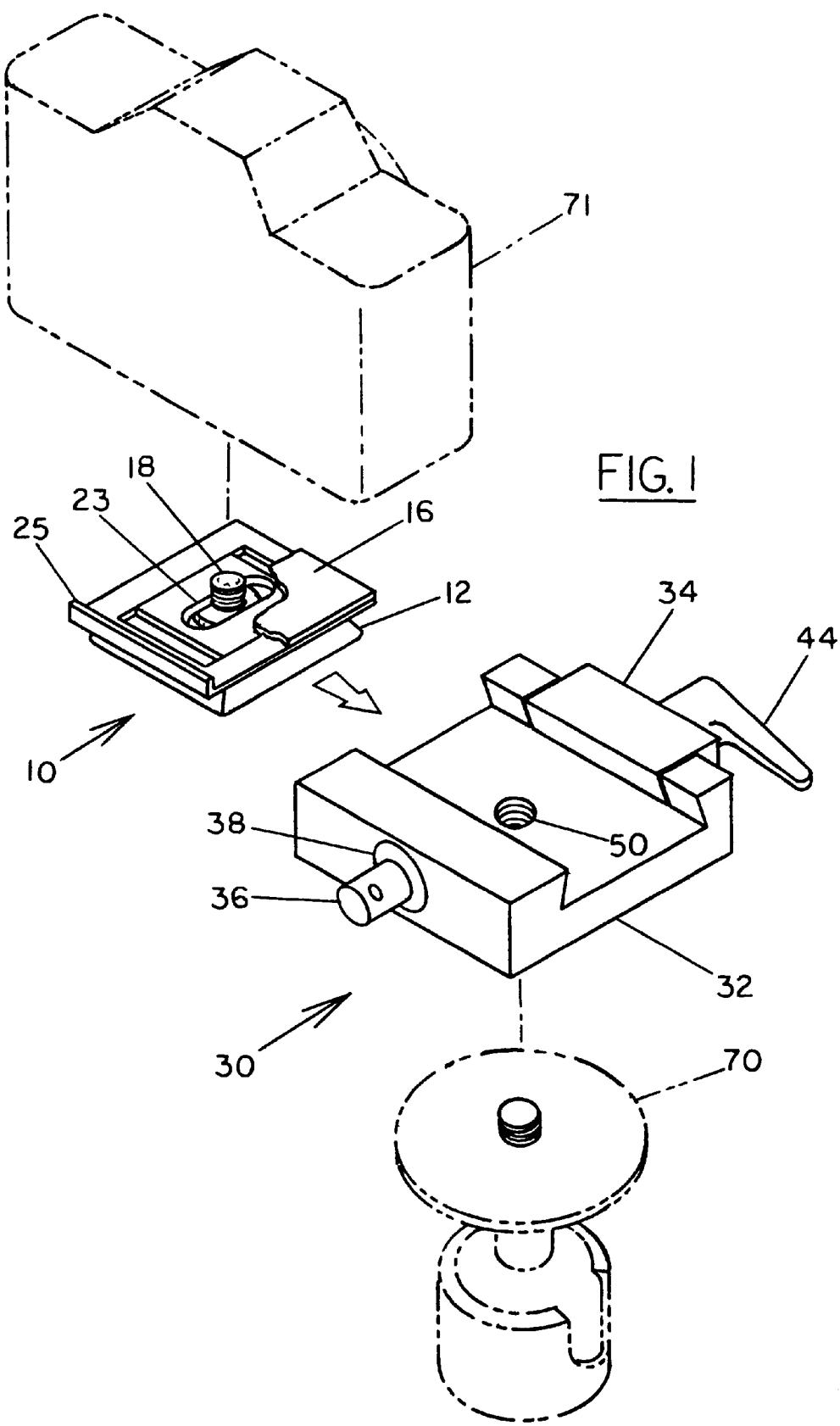
FIG. 1 shows a typical application of the device joining a camera to a ball head as the typical embodiment of the present invention.

FIG. 1 illustrates Release-Plate Assembly Device 10 which secures Camera 71 to Positive-Lock Base Assembly Device 30 attached to Ball Head 70. Although FIG. 1 references Ball Head 70 and Camera 71, it is to be understood that the device as described in accordance with the present invention, can be used to join any supporting device, i.e., tripods, monopods, ball heads, slide bars, focusing rails, etc. with any photo equipment device, i.e., cameras, lens, flash mounts, brackets, etc.

Figure 2:
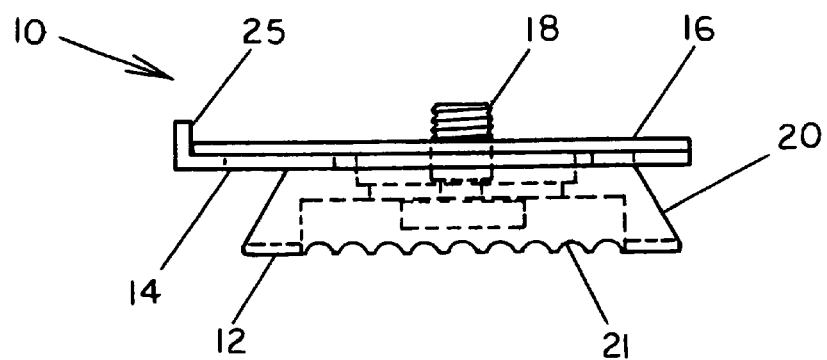
FIG. 2 shows the camera Positive-Lock-and-Release Plate assembled in side elevation.
Figure 3:
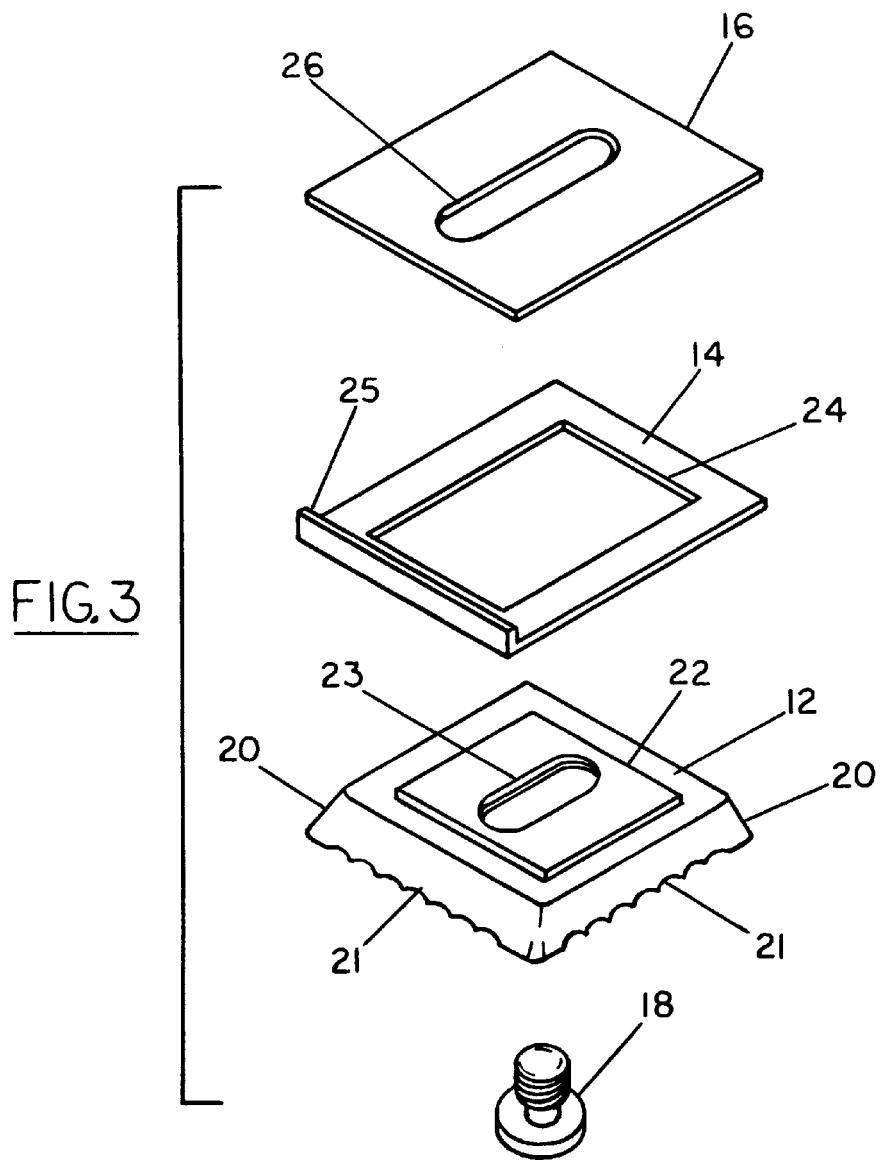
FIG. 3 shows the association of individual parts that are in the Release-Plate Assembly in a fragmented perspective view of FIG. 2.

Referring to FIGS. 2 and 3 showing a side elevation and a fragmented perspective view of Release-Plate Assembly 10 of the present invention that includes Release Plate 13, Locking Plate 14, Plate Gasket 16, and Attachment Screw 18. Individual elements of Release-Plate Assembly 10 are best shown in FIG. 3. Regarding Release Plate 12, each Side 20 is equal in length, height, and tapper.

Pattern 21 is provided on the bottom face of Plate 12 shown best if FIG. 2. (The Striation configuration of 21 conforms to the diameter of Nose 53 on Detent Pin 36 shown in FIG. 5.) Referring again to FIG. 3, the top of Release Plate 12 has a Raised Deck 22 that is square on its sides, is center located, and in a height to accommodate the exact thickness of Locking Plate 14. Plate 12 also has a Cutout 23 that allows Screw 18 to move the length of the Cutout. Locking Plate 14 is the exact thickness of the Raised Deck 22 of Release Plate 12. The width of Cutout 24 in Plate 14 is a close-tolerance fit with the Raised Deck 22 of Release Plate 12.

The length of Cutout 24 in Plate 14 is greater than the square dimension of Raised Deck 22 to allow Release Plate 12 to be adjusted for attachment to Device 71. A Locking Plate Lip 25 is formed at one end of Plate 14 with a lip height that will accommodate the thickness of Plate Gasket 16 and capture any vertical surface of Device 71. Width of Cutout 26 in Plate Gasket 16 allows clearance for Screw 18. Length of Cutout 26 in Plate Gasket 16 must allow for movement of Locking Plate 14 when assembled to Release Plate 12. Plate Gasket 16 is bonded to Locking Plate 14.

Figure 4:
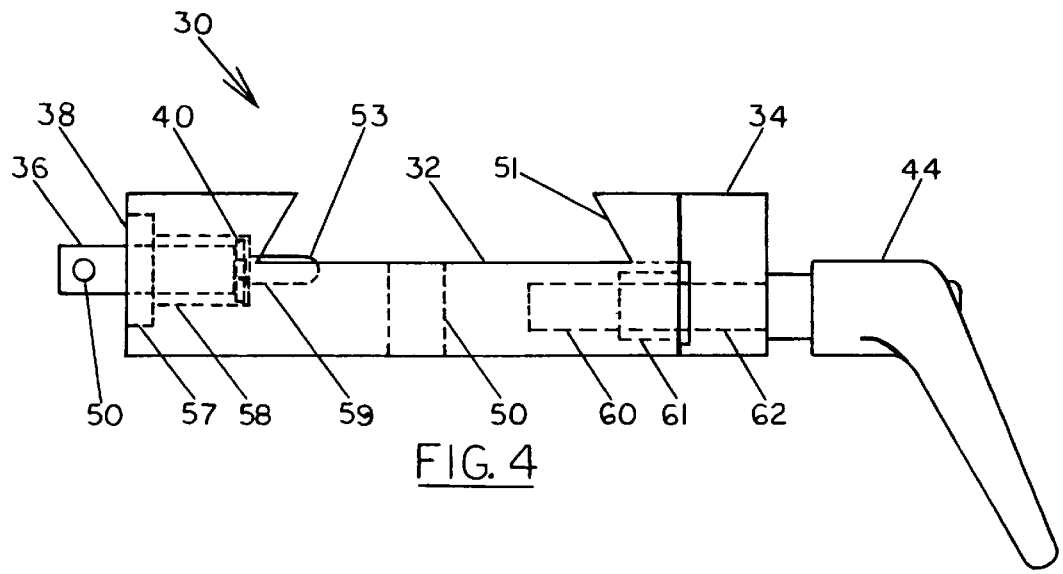
FIG. 4 shows the Positive-Lock-and-Release Base assembled in a side elevation view.

FIG. 4 shows a side elevation view of the Positive-Lock-and-Release Base Assembly 30 of the present invention that includes Release Base 32, Clamp Block 34, Detent Pin 36, Retaining Plug 38, 'E' Clip 40, Springs 42a and 42b (not shown) and Clamp Handle 44. Regarding Release Base 32, a dovetail-configuration defined by Tapper 51 with a depth determined by the height and tapper of side 20 (shown best in FIG. 2) on Release Plate 12. The width of the dovetail opening in Release Base 32 allows Release-Plate Assembly 10 unrestricted entrance and exit. Isometric view of Base Assembly 30, FIG. 1 shows the best relationship and physical positioning of the dovetail in Release Base 32, as well as Clamp Block 34, Detent Pin 36, Retaining Plug 38, and Threaded Hole 50.

Figure 5:
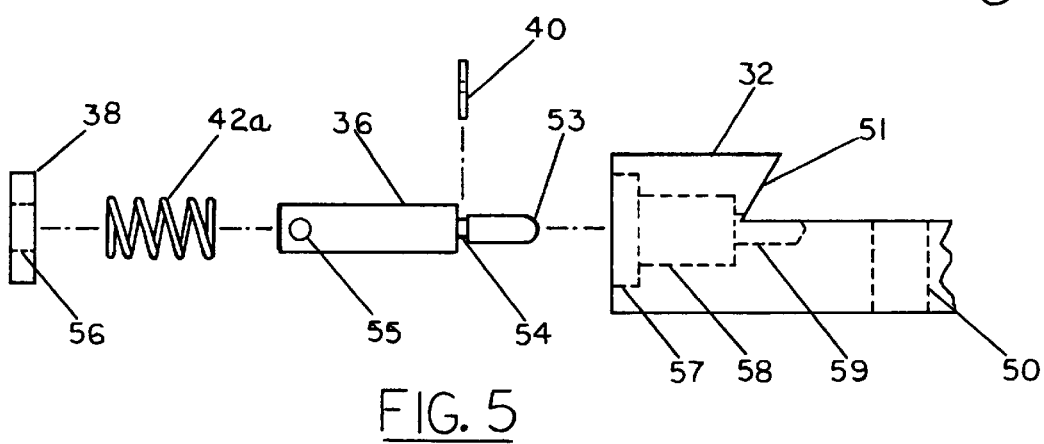
FIG. 5 shows the association of individual parts for the Detent Pin Mechanism in a fragmented side elevation view of FIG. 4.

Referring to FIG. 5 shows a fragmented side elevation view of a Detent Pin 36, Retaining Plug 38, and 'E' Clip 40 and Spring 42a. This portion of Base 32 shows the position of Holes 57, 58 and 59 which accommodate Pin 36, Plug 38, and Spring 42a. Hole 59 is so located in Base 32 that the Nose 53 of Pin 36 is slightly raised above the floor of the dovetail, protruding by only a small portion of its diameter as best shown in FIG. 4. The diameter of Nose 53 is matched to radius of Striation 21 of Release Plate 12, providing a positive locking between the Pin Nose 53 and the Striation 21 when Release-Piate Assembly 10 is attached to Release Base Assembly 30.

Continuing with FIG. 5, Hole 58 accommodates the outside diameter of both 'E' Clip 40 and Spring 42a. The depth of Hole 58 is such that Spring 42a is in constant compression when fully assembled in Base 32. Hole 59's depth is the exact thickness of Retaining Plug 38 and the diameter is such that a press fit exists between Plug 38 and Base 32. Hole 56 is a clearance hole in Plug 38 that allows for free movement of Pin 36 in a back and forth motion. Hole 55 shown in Pin 36 is for a pull ring (not shown) that provides for easy grasp and operation of the Detent Pin during entrance and exit of Release-Plate Assembly 10. 'E' Clip 40 is installed on Pin 36 to provide Spring retention and a stop against the bottom of Hole 58. Location 54 on Pin 36 is sized to accommodate standard 'E' Clips as supplied by various manufacturers.

Figure 6:
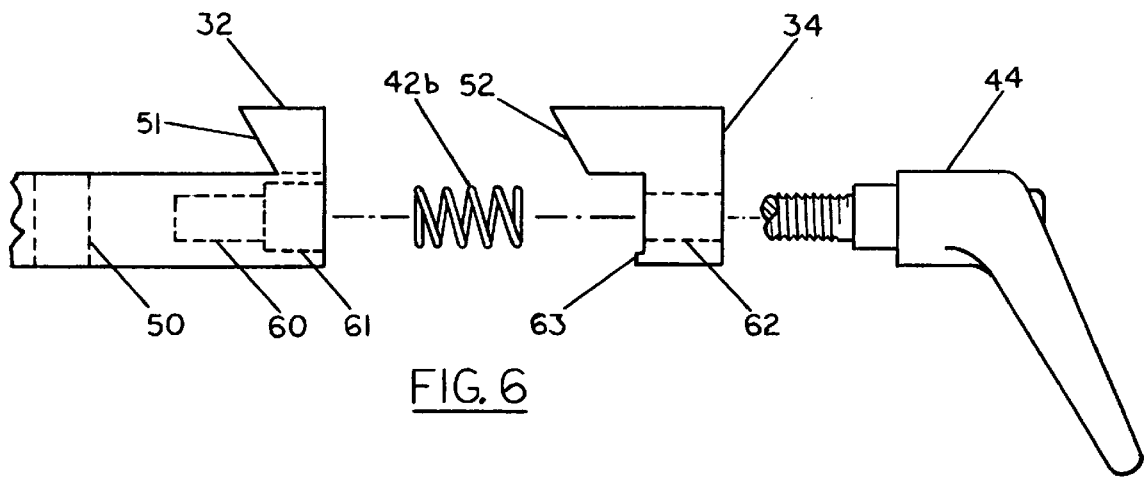
FIG. 6 shows the association of the individual parts for the Clamping-Block Assembly in a fragmented side elevation view of FIG. 4.

Referring to FIG. 6, shows a fragmented side elevation view of a portion of Base 32; i.e., Clamp Block 34, Clamp Handle 44, and Spring 42b. The Clamp Block 34 is a moveable segment of the basic dovetail configuration of Base 32 and Tapper 52 must match that of tapper 51 in Base 32. Block 34 acts to close the dovetail opening once Release-Plate Assembly 10 is in place. Clamp Handle 44 is turned into Threaded Hole 60 in Base 32, bringing pressure to the side of Block 34. Clearance Hole 62 in Block 34 accommodates the outside thread diameter of Handle 44 while Hole 61 in Base 32 accommodates the outside diameter of Spring 42b Depth of Spring Hole 61 is such that Spring 42b is in constant compression and will push Clamping Block 34 outward from Base 32 as Clamp Handle 44 is being disengaged, thus removing pressure to sides of Release-Plate Assembly 10 and clearing the dovetail opening in Base 32.

To provide a complete surface engagement of Tapper 52 of Clamp Block 34, with Tapper 20 of Release Plate 12, a small Toe/Rib 63 is formed running the length of Clamp Block 34. During clamp tightening, Toe 63 engages the side of Base 32 causing a rolling action of Block 34 producing a 100% surface engagement of 52 and 20.

Operation

FIGS. 1 to 6

The operation of Release-Plate Assembly 10 as shown in FIG. 1 is attached to Device 71 by inserting Screw 18 into its threaded (as provided) attach point. Before tightening Screw 18, the orientation of Locking Plate Lip 25 is adjusted to capture any candidate surface of Device 71. Holding Lip 25 at the selected position and in a secure fashion has allowed Release Plate 12 to automatically adjust itself with Plate 14. With this operation completed, it enables Screw 18 to be fully tightened into device 71. Plate Assembly 10 (cushioned by Gasket 17) now becomes a solid, non-rotating attachment so even during continuous handling, Device 71 cannot work itself loose on Screw 18.

The operation of Release Base Assembly 30 as shown in FIG. 1, is first secured to supporting device Ball Head 70 at threaded Hole 50 in Base Assembly 30. It is necessary that the dovetail in Base 32 be open to accommodate the insertion of Release-Plate Assembly 10. To do this, loosen Clamp Handle 44 and observe the movement of Clamp Block 34 as it is being pushed away from Base 32 by Spring 42b. When block 34 has traveled enough to allow access by Plate Assembly 10 it is considered to be in the open or unclamped mode. With the Clamp Block in the open mode, insertion of Plate Assembly 10 into the Base Assembly 30 dovetail may begin. As insertion is in progress, pull ring (not shown) attached to Detent Pin 36, must be pulled and held in an outward fashion. Doing so removes Pin Nose 53 from the at-rest location in Base 32, and allows complete insertion of Plate Assembly 10. With Plate Assembly 10 in a desired location release the Detent Pin so that the nose of Pin 53 will engage Striation 21 of Plate Assembly 10. Spring 42a will forcibly hold the Detent Pin in the engaged position until such time removal of Assembly 10 is desired. While the Detent Pin is engaged in Assembly 10 it will be impossible for any accidental detachment to take place.

To firm up or tighten Assembly 10 in its Detent location, Clamp Handle 44 is turned in a tightening fashion that moves Block 34 into full surface contact with Assembly 10.

While this embodiment of the invention defines the Assembly 10 and Base 30 relationship, it only shows Device 70 and 71 as one of many applications as described in opening paragraph of the detailed description section.

Conclusions, Ramifications and Scope

Accordingly, the reader will note that the locking plate, in conjunction with the release plate and the detent locking pin of this invention, will demonstrate a convenient and reliable operation of the quick release. Furthermore, the release plate and locking plate configurations have additional advantages in that:

they offer a convenient adjustment to capture camera device apertures at their various locations;

they provide a protective barrier for sensitive surface protection;

they transfer the twisting torque load away from the aperture screw and are applied directly to the release plate;

they permit the production of its various features, in sizes that will accommodate a full range of camera configurations.

In addition, the striations of the release plate in association with the detent locking pin and the clamping block of the release base, will provide further advantages in that:

they prevent accidental exit of release plate from the base plate;

they allow for random orientation of the camera to the base plate;

they provide very high clamping pressures.

Although the description of the above contains many specifities, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. A coupling mechanism that controllably joins a camera device to a support device, comprising:

(a) a base plate having a longitudinally extending slot, the boundaries of said slot defined by one solid side wall, and a second side wall having a predetermined space to accommodate a movable clamping block, said base plate having an aperture of a predetermined shape and location that allows for a detent pin mechanism that controllably couples a release plate to said base plate;

(b) a release plate having a first shape that is of equal length on four sides and slideably engages within the slot of said base plate, said release plate having a lower surface whose periphery has a plurality of striations of a predetermined shape that mates with a detent pin mechanism and said release plate having an upper surface being defined by a raised boss portion that is substantially square providing anti-torsional engagement when mated to a locking plate, said upper surface of said release plate having a slot for attachment to said camera;

(c) a clamping block having a predetermined cross-sectional shape that mates within the said second side wall of said base plate and by slideable engagement generates torsional clamping of the release plate;

(d) a detent pin mechanism having a shape that mates with said aperture of said base plate, allowing slideable engagement of said dentent pin mechanism with the plurality of striations of the release plate; and (e) a locking plate having a first shape cut-out which mates with said raised boss portion of said release plate, the width of said cut-out predetermined to controllably allow a slideable engagement between said release plate and said locking plate.

2. The coupling mechanism of claim 1, wherein the locking plate has a second extended angular shape at one end of said locking plate to engage the vertical surface of said camera device to control rotational coupling.

* * * * *